June 11, 1968     F. ATZBERGER     3,387,411

BRAKE-SHOE GRINDING DEVICE

Filed June 15, 1965     2 Sheets-Sheet 1

INVENTOR
FRANK ATZBERGER
BY
ATTORNEY.

June 11, 1968  F. ATZBERGER  3,387,411
BRAKE-SHOE GRINDING DEVICE
Filed June 15, 1965  2 Sheets-Sheet 2
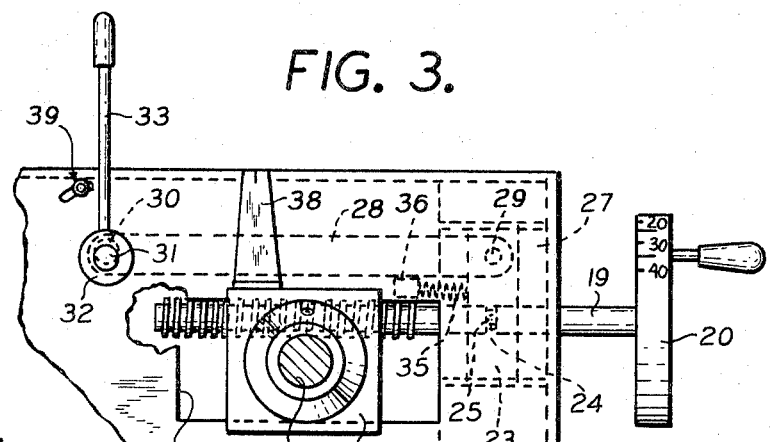
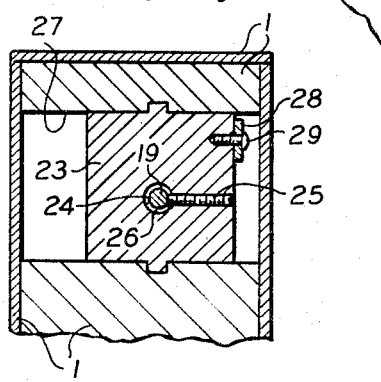
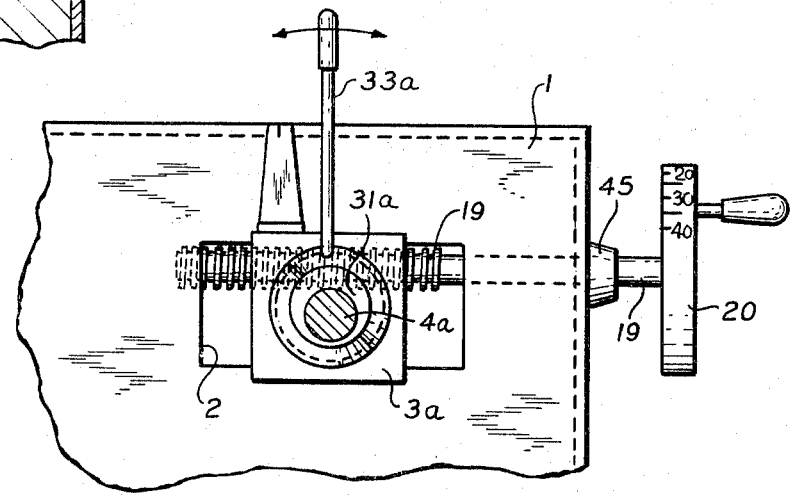
INVENTOR
FRANK ATZBERGER
BY
ATTORNEY.

United States Patent Office 3,387,411
Patented June 11, 1968

3,387,411
BRAKE-SHOE GRINDING DEVICE
Frank Atzberger, 97—26 Sutphin Blvd.,
Jamaica, N.Y. 11435
Filed June 15, 1965, Ser. No. 464,019
5 Claims. (Cl. 51—95)

ABSTRACT OF THE DISCLOSURE

A brake-shoe grinding device for refinishing brake-shoes as a workpiece, which comprises a frame having a recess and slide means are movable in the recess of the frame. A threaded spindle is rotatably but axially immovably mounted in the slide means, so that upon rotation of the spindle, the slide means is displaced. A bolt extends horizontally from the slide means and at least one support means is secured to the bolt for movement in axial direction of and rotation about the bolt. Grinding means supported for rotation are in substantially parallel relation to the bolt, and means for adjusting the distance between the grinding means and the support means are arranged, the adjusting means include separately controllable coarse and fine adjusting means and the threaded spindle constitutes the coarse adjusting means. The adjusting means include a hand wheel for moving the slide means along in axial direction of the threaded spindle, and means are provided for biasing the slide means out of engagement with the grinding means.

---

The present invention relates to a device for grinding brakeshoes, particularly adapted to be used for brakes in automotive vehicles.

It is known that braking surfaces of brake-shoes require finishing from time to time in order to restore the exact cylindrical surfaces of the brake-shoes.

As a rule, the refinishing of brake-shoes is done by mounting the same onto the chuck of a lathe or similar machine tool, for rotation about its own axis. The worn surface to be refinished is then subjected to successive cutting operations of a roughing tool and a finishing tool, suitably secured to and carried by a turret-head, the latter being secured to and carried by the forward face of a shank. The latter is usually carried by a slide rest or the like, by which the tool is held and traversed.

The necessary special lathes are available only in special shops. Thus, the refinishing or grinding of brake-shoes was hitherto a comparatively expensive procedure.

It is, therefore, one object of the present invention to provide a device for grinding or refinishing brake-shoes, which is of extremely simple construction and may be used in any gas station, small repair shop, or even a garage, without requiring a particular lathe.

It is another object of the present invention to provide a device for grinding brake-shoes, wherein one or two brake-shoes are mounted on appropriate supporting brackets where they may be properly centered, a coarse and fine adjusting means being provided for approaching the brake-shoes to and removing them from the periphery of a rotating grinding cylinder.

It is yet a further object of the present invention to provide a device in which the brake-shoe may be moved axially in addition to the movement toward and away from the rotating grinder cylinder.

It is yet another object of the present invention to provide a device, wherein a relatively simple fine-adjusting means is provided by way of an eccentric allowing, besides coarse lateral movement of the brake-shoe before or during the grinding operation.

With these and other objects in view which will become apparent in the following detailed description, the present invention will be clearly understood in connection with the accompanying drawings, in which:

FIG. 3 is an elevation along the lines 3—3 of FIG. 2, parts being broken away for the purpose of better demonstration;

FIG. 4 is a section along the lines 4—4 of FIG. 2; and

FIG. 5 is a front elevation of another embodiment of the device similar to that of FIG. 3.

Figure 1:
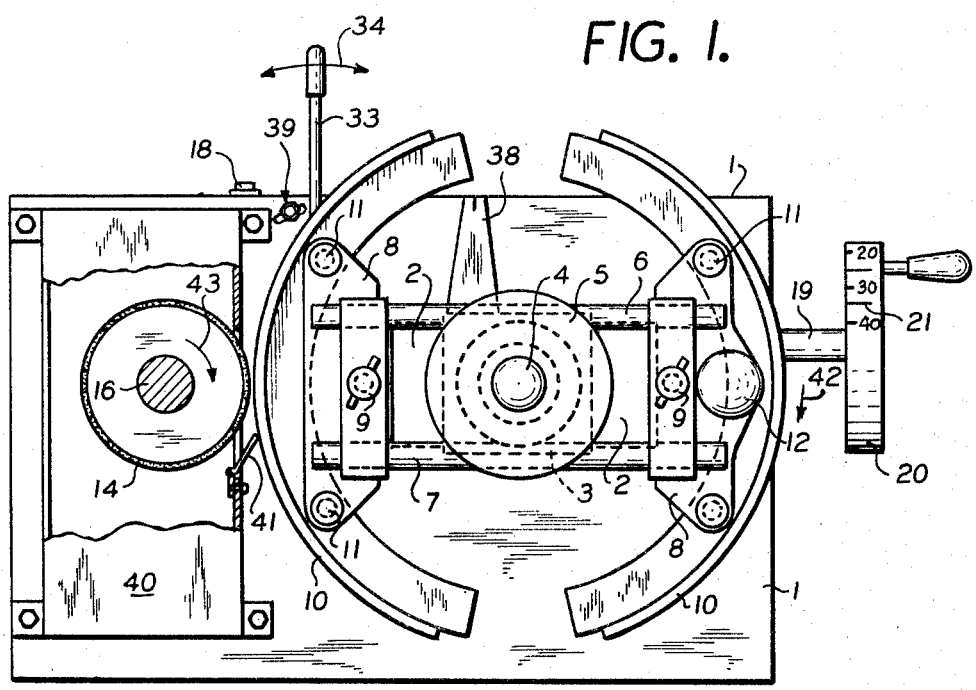
FIGURE 1 is a front elevation of the brake-shoe grinding device designed in accordance with the present invention.
Figure 2:
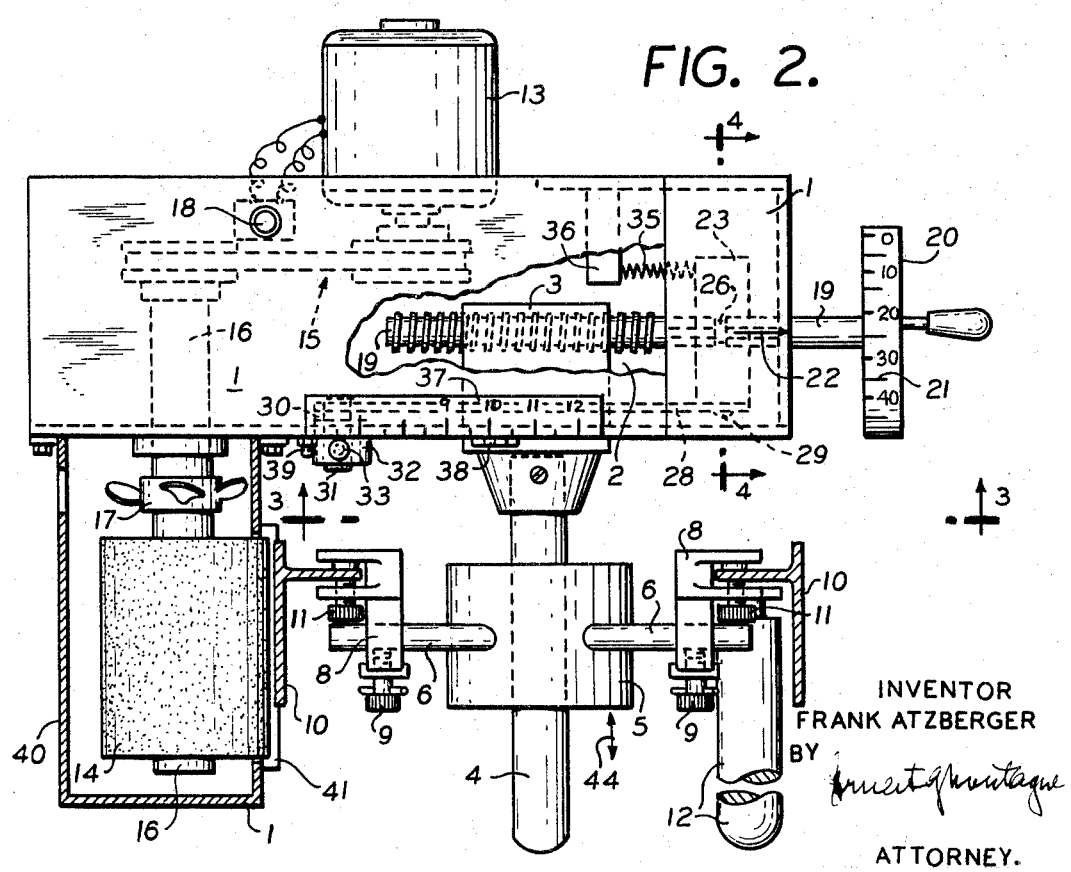
FIG. 2 is a top plan view, partly in section, of the device disclosed in FIG. 1.

Referring now to the drawings and in particular in FIGS. 1 and 2, the brake-shoe grinding device comprises a frame 1, having a recess 2, in which a carriage or slide 3 is displaceably disposed. Conventional means, like tongues and grooves, or dovetail-shaped guides may be provided as guiding means for the slide 3. A horizontally disposed bolt 4 is journaled in the slide 3 and has a forwardly protruding, rounded-off end which receives a bracket 5. The latter carries two vertically spaced apart bars 6 and 7, and the ends of the bars 6 and 7 have secured thereto adjustable brake-shoe supports 8. Releasable securing means, as thumb or knurled screws 9 are used between the bars 6 and 7 and the supports 8, so as to adjust the distance of the latter from the longitudinal axis of the bolt 4.

The arcuate brake-shoes to be ground on the device according to the present invention are shown at 10. Fastening bolts 11 secure brake-shoes 10 to the supports 8. One of the supports 8, e.g., the one shown on the right-hand side of FIGS. 1 and 2, has a forwardly protruding handle 12 attached thereto for manually turning the brake-shoes 10 with their supporting structure, as will be more clearly set forth below.

The brake-shoe grinding device is operated by an electric motor 13 which drives a sand grinder 14 by way of appropriate pulleys and a belt, the drive being generally designated 15. The grinder 14 is secured to a shaft 16 which carries also a bladed fan 17 adapted to remove the ground and abrasive particles within the frame of the device. A conventional electric switch 18 controls the operation of the electric motor 13.

The bolt 4 jointly with the brake-shoes 10 mounted thereon can be moved closer or farther away from the grinder 14. To this end, coarse and fine adjusting means for such movement are provided. In order to bring about the coarse adjustment, a threaded spindle 19 is provided, which passes through a complementary threaded bore of the carriage or slide 3; at its outer free end, the threaded spindle 19 is equipped with a hand wheel 20. The hand wheel 20 may be provided with graduations 21. An index or pointer 22 is provided on the frame 1, as shown in FIG. 2 of the drawings.

Referring now again to the drawings, and in particular to FIG. 4, a second slide 23 is provided which has a bore 24 for the passage of the spindle 19. A set screw 25 engages an annular groove 26 of the spindle 19, so that the slide 23 cannot move in axial direction of the spindle 19. As long as the latter is stationary, manual rotation of the hand wheel 20 will displace the carriage 3 in one direction or the other, bringing the brake-shoes 9 closer or away from the grinder 14.

In order to bring about the afore-mentioned fine adjustment, the frame 1 has another recess 27, in which the slide 23 can be displaced within certain limits (see FIGS. 3 and 4). Conventional guide means may, of course, be provided, as schematically shown in FIG. 4 between the slide 23 and the frame 1.

A link 28 is pivoted at one end in the slide 23 at a fulcrum 29 (FIG. 3); the other end of the link 28 can be acted upon by an eccentric mechanism constructed as follows: A bushing 30 is provided in the frame 1, in which shaft stub 31 having an angularly bent front portion parallel with its rear portion is rotatably received in the bushing 30. An eccentric disc 32 is secured to the front portion to which disc 32, in turn, is attached the other end of the link 28. A hand lever 33 projects upwardly from the disc 32, which lever can swing in both directions, as indicated in FIG. 1 by an arrow 34.

When actuating the lever 33, the shaft stub 31 will perform a corresponding small rotation with the disc 32, so as to displace the attached link 28, the slide 23 and consenquently the spindle 19 which holds the carriage 3 with the brake-shoes 10. A compression spring 35 is disposed between the slide 23 and a frame projection 36 for urging the slide 23 and thereby the spindle 19 away from the grinder cylinder 14, against the grinder-engaging movement of the lever 33 to the left-hand side, as viewed in the drawings.

By the arrangement just described, a fine adjustment is brought about between the brake-shoes 10 and the grinder 14. The top of the machine frame 1 has a fine graduation 37, while an index 38 is attached to the carriage 3, supplementing thereby the coarse indication provided by the hand wheel 20. These setting means are particularly shown in FIG. 2, where the coarse indicators 21 and 22, as well as the fine indicators 37 and 38 are clearly shown.

An adjustable stop member 39 secured to the front wall of the frame 1 is disclosed, which limits the leftward swinging movement of the hand lever 33, as viewed in FIGS. 1–3.

As a matter of example, the stop member may be constituted by a bolt slidable in an arcuate slot of the frame 1 and adapted to be retained in any position, e.g., by means of a threaded nut or a counter-nut behind the front wall (not shown).

The stop member 39 is adapted to limit the fine adjustment towards the grinder 14, while movement in the opposite direction, away from the grinder is not limited.

A forwardly protruding portion 40 of the frame 1 (FIG. 2), which lodges the grinder 14 is equipped with a hinged flap 41, which normally abuts against the outer surface of the brake-shoe 10 facing the grinder 14. The preferred direction of rotation of the spindle system 4 with the brakeshoes 10 being in clockwise direction, as indicated by the arrow 42 (FIG. 1), relative to the similarly clockwise direction of rotation of the grinder 14, indicated by the arrow 43, the flap 41 will prevent the brake-shoes 10 from being rotated in the wrong direction, that is counterclockwise. As shown in FIG. 2 the flap 41 is of a length to cover the entire engaging surface of the rotating grinder 14, underneath an appropriate recess of the frame portion 40, so that the flap 41 also serves the purpose of directing the ground and removed metal and abrasive particles inside the frame portion 40 (see also FIG. 1), regardless of the axial position of the brake-shoes 10 with respect to the spindle 4, rather than to allow these particles to drop underneath the line of engagement between the treated brake-shoe 10 and the grinder 14. The mentioned fan 17 contributes to the removal of the ground metal and abrasive particles.

The brake-shoe grinding device is operated in the following manner: One or two brake-shoes 10 are secured onto the support 8 by releasing and then tightening the fastening bolts 10. The radial distance of the support 8 from the longitudinal axis of the spindle 4 has, by means of the screws 9, been previously adjusted. Upon starting the motor 13 by operation of the switch 18, the operator holds on to the handle 12 with one hand, while operating the coarse adjustment (handwheel 21) with the other hand.

It is also possible to preset the coarse adjustment with the hand wheel 21 and to operate the fine adjusting lever 33. During the grinding operation, while slowly manually rotating the brake-shoes 10 in the direction of the arrow 42 by means of handle 12, the bracket 5 is also movable in axial direction, as shown by the double-headed arrow 44 in FIG. 2. This axial setting of the bracket 5 brings about a uniform grinding of the entire width of the brake-shoes, and the operation with the entire working surface of the grinder 14.

Upon completion of the grinding of the brake-shoe or shoes which have been attached to the support, the latter is moved away from the grinder 14 by turning the hand wheel 20 in opposite direction. A new set of brake-shoes is then fastened to the support, so as to repeat thereafter the grinding procedure.

FIG. 5 shows a modified embodiment of the arrangement, wherein a carriage 3a is movable within the recess 2 of the frame 1. A stud 4a is adjustably attached to the carriage 3a by means of a shaft sleeve or stub 31a, fitted into a recess of the carriage 3a, and having itself an eccentric bore for the stud 4a. A hand lever 33a is attached to the sleeve 31a, so as to rotate the same slightly, causing thereby a lateral shifting of the stud 4a with respect to the carriage 3a. Thus, the fine adjusting means of FIG. 5 acts on the stud 4a by slightly displacing it laterally, in one direction or the other, while the coarse adjustment by the hand wheel 20 moves the slide 3a in the recess 2, as has been described previously for the first embodiment. The operation of the modified device is essentially the same as described before. A supporting bushing 45, secured to the frame 1 for the threaded spindle 19 is disclosed, allowing free longitudinal sliding of the spindle movement, while sufficiently supporting it at its end close to the hand wheel 20.

While I have disclosed several embodiments of the present invention, it is to be understood that these embodiments are given by example only and not in a limiting sense, the scope of the present invention being determined by the objects and the claims.

I claim:

1. A brake-shoe grinding device for refinishing brake-shoes as a workpiece, comprising
   a frame having a recess, slide means movable in said recess of said frame,
   a threaded spindle rotatably but axially immovably mounted in said slide means, so that upon rotation of said spindle, said slide means is displaced,
   a bolt extending horizontally from said slide means,
   at least one support means secured to said bolt for movement in axial direction of and rotation about said bolt,
   grinding means supported for rotation in substantially parallel relation to said bolt,
   means for adjusting the distance between said grinding means and said support means,
   said adjusting means including separately controllable coarse and fine adjusting means,
   said threaded spindle constituting said coarse adjusting means,
   said adjusting means including a hand wheel for moving said slide means along in axial direction of said threaded spindle, and
   means for biasing said slide means out of engagement with said grinding means.

2. The grinding device, as set forth in claim 1, wherein said fine adjusting means includes movable bearing means for a portion of said coarse adjusting means,
   an eccentric stub shaft pivotable in said frame and operatively connected to said bearing means, and actuating means for pivoting said stub shaft in either direction, thereby moving said slide means jointly with said threaded spindle.

3. The grinding device, as set forth in claim 2, wherein said bearing means comprises a second slide means movable with said first mentioned slide means and said threaded spindle, and a link is operatively connecting said stub shaft with said second slide means so that upon operation of said actuating means said second slide means is adjusted.

4. The grinding device, as set forth in claim 2, which includes adjustable stop means for said actuating means, for limiting its movement in at least one direction.

5. The grinding device, as set forth in claim 4, which includes a hinged flap attached to said frame in a peripheral region of said brake-shoe, for frictionally preventing rotation of said brake-shoe against the edge of said flap.

References Cited
UNITED STATES PATENTS

| | | | |
|---|---|---|---|
| 1,952,130 | 3/1934 | Harrison | 51—217 X |
| 2,225,806 | 12/1940 | Stone | 51—217 X |
| 2,345,161 | 3/1944 | Thomason | 51—217 X |
| 2,604,739 | 7/1952 | Evans | 51—217 X |
| 2,715,799 | 8/1955 | Billeter | 51—96 |
| 2,789,404 | 4/1957 | Downing | 51—273 |
| 3,022,610 | 2/1962 | Barrett | 51—96 |
| 3,025,645 | 3/1962 | Bonkowski | 51—105 |
| 3,060,644 | 10/1962 | Wisti | 51—96 |

ROBERT C. RIORDON, *Primary Examiner.*

LESTER M. SWINGLE, *Examiner.*

D. G. KELLY, *Assistant Examiner.*